R. McMYERS.
STABILIZER.
APPLICATION FILED MAY 31, 1917.
1,279,133.
Patented Sept. 17, 1918.
2 SHEETS—SHEET 1.
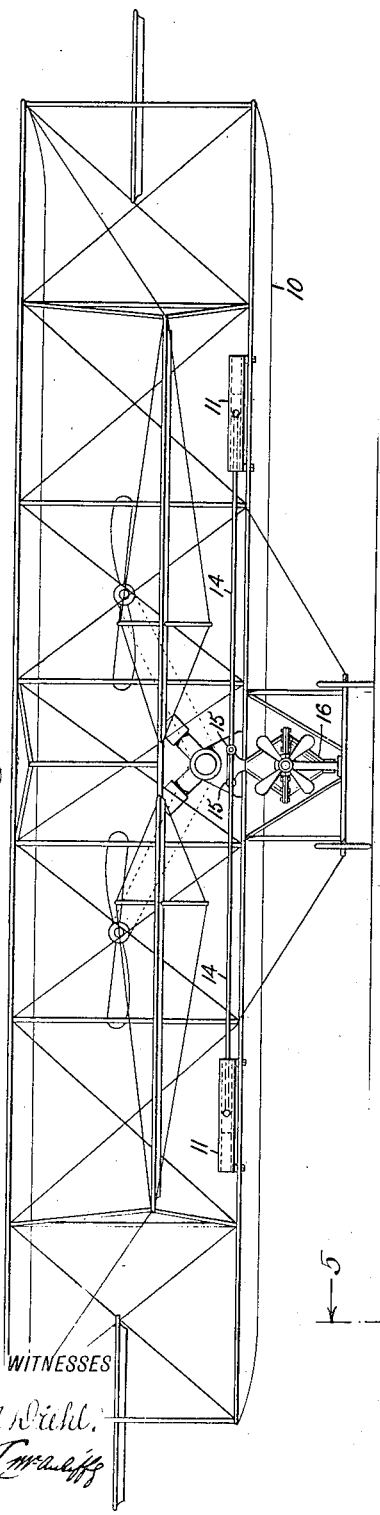
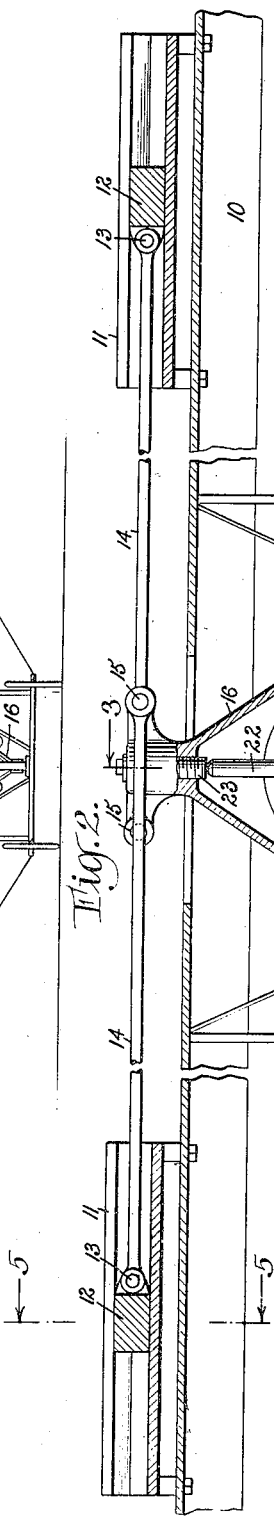
INVENTOR
R. McMyers

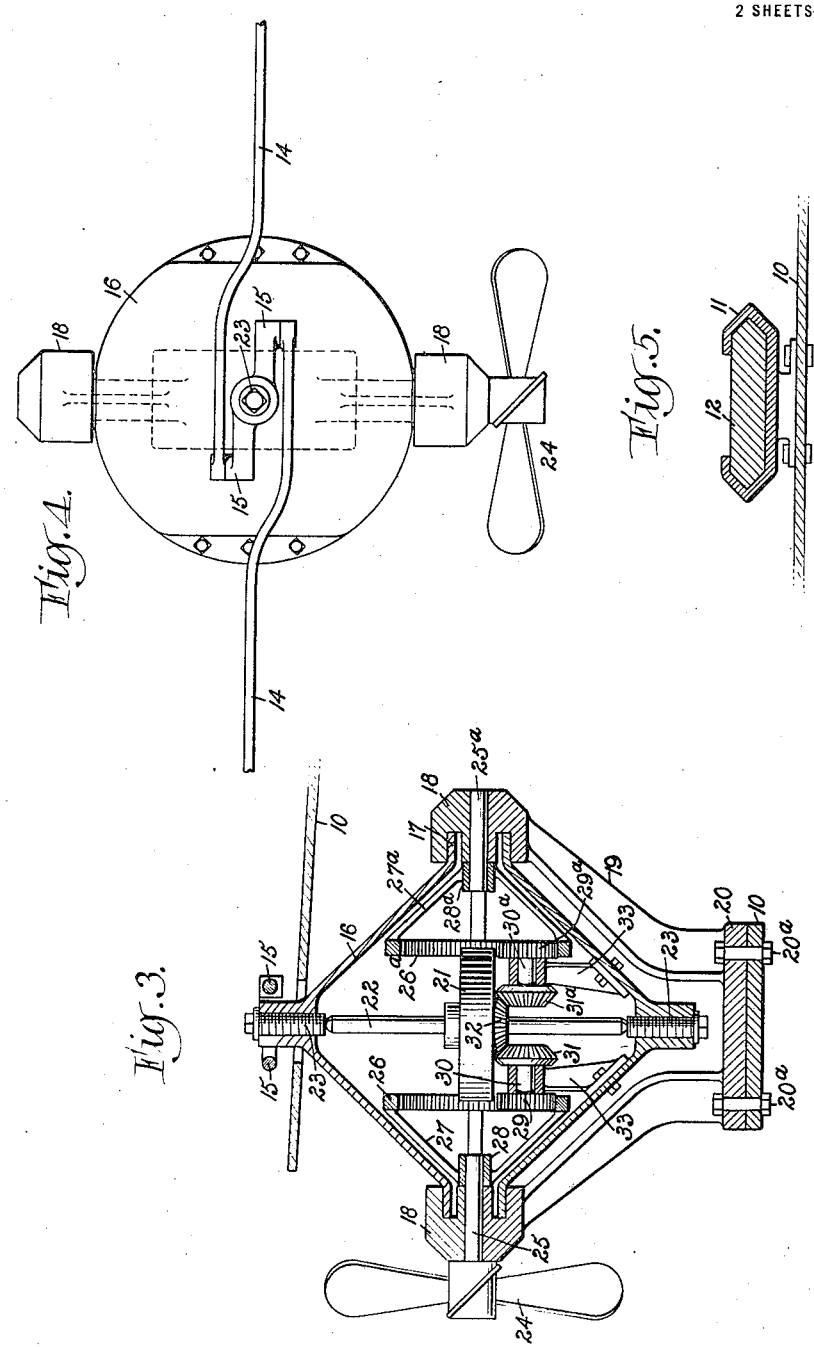

UNITED STATES PATENT OFFICE.

RICHARD McMYERS, OF BRIDGEPORT, CONNECTICUT.

STABILIZER.

1,279,133. Specification of Letters Patent. Patented Sept. 17, 1918.

Application filed May 31, 1917. Serial No. 171,896.

*To all whom it may concern:*

Be it known that I, RICHARD MCMYERS, a citizen of the United States, and a resident of Bridgeport, in the county of Fairfield and State of Connecticut, have invented a new and Improved Stabilizer, of which the following is a full, clear, and exact description.

My invention relates to a stabilizer for aeroplanes, hydroplanes, and other air and water craft, and the prime object of my invention is to provide a stabilizing means involving a gyroscope and means to shift the center of gravity of the vessel by displacing a porton of the mass thereof through the medium of the gyroscopic action upon a lateral tilting of the craft whereby to maintain stability.

Another object of the invention is to mount the gyroscope and its appurtenances in an improved manner for facilitating and making effective the actuating function of the gyroscope on stabilizing means.

Other objects of the invention as well as the advantages thereof and the nature of the means entering into the preferred embodiment of the invention will appear as the description proceeds.

Reference is to be had to the accompanying drawings forming a part of this specification in which similar reference characters indicate corresponding parts in all the views, it being understood that the drawings are merely illustrative of one example of the invention.

Figure 1 is a front elevation of an aeroplane equipped with my improved stabilizer;

Fig. 2 is a fragmentary transverse vertical section of the stabilizer and a portion of the aeroplane, the view being on an enlarged scale;

Fig. 3 is a transverse vertical section on the line 3—3, Fig. 2;

Fig. 4 is a plan view of the gyroscope and portions of the elements actuated thereby;

Fig. 5 is a detail in cross section on the line 5—5, Fig. 2.

For the purpose of illustration I have shown my invention applied to an aeroplane 10 which, it will be understood, may be of any approved construction.

The means whereby to displace a portion of the mass at opposite sides of the approximate center of the aeroplane through the action of the gyroscope upon a tilting of the plane or other craft, consists preferably of weights 12 positioned at opposite sides of the center and adapted to have guided movement transversely of the vessel in suitable guides 11. Pivotally connected with the weights 12 as at 13 are connecting rods 14, the opposite ends of said rods overlapping and being pivotally connected as at 15 with opposite sides of a frame, designated generally by the numeral 16, and which frame is preferably in the form of a housing for the gyroscope and its drive gear. The frame 16 has hollow trunnions 17 which turn in fixed bearings 18, said bearings in the present example being formed on standards 19, the base 20 of which is suitably secured as by bolts 20ª to the frame work of the aeroplane 10.

A gyroscopic wheel 21 is mounted on a vertical spindle 22, the upper and lower ends of which turn in center bearings 23 which advantageously are in the form of screw plugs in the top and bottom, respectively, of the frame 16. The arrangement is such that the frame 16 will be subject to the gyroscopic action of the wheel 20.

The gyroscope is driven by the resistance of the air or water for which purpose a fan 24 is provided, mounted on a shaft 25, the axis of which is transverse to the axis of rotation of the gyroscopic wheel 21. An internally toothed gear wheel or annular rack 26 is secured to the shaft 25, the wheel being sustained by conically disposed arms 27 secured to the hub 28 which is suitably keyed to said shaft 25. A pinion 29 is in mesh with the internal gear 26 and is mounted on a shaft 30 on the opposite end of which is a bevel pinion 31 meshing with a similar pinion 32 on the spindle 22 of the wheel 21. The gear wheel 26 and the pinions 29, 31 are disposed adjacent to one side of the gyroscopic wheel 21 and in order to balance the structure, I provide diametrically opposite the shaft 25 and the gears driven thereby, idler elements 25ª to 31ª corresponding with the elements 25 to 31. The shafts 30 and 30ª are mounted in suitable bearings provided on standards 33 or other parts appurtenant to the frame 16.

It will be seen that the frame or housing 16 may turn through an angle about the axis of the shafts 25, 25ª while the gyroscopic wheel turns about an axis perpendicular thereto. In operation therefore the wheel 21 being revolved by the pressure developed by the headway of the craft, should the craft tilt laterally and thereby correspondingly tilt the weights 12, the constant position of the gyroscopic spindle 22 and the influence of the gyroscopic wheel on the frame 16 will shift the weights 12 relatively to the frame of the aeroplane or the like, or will rather tend to cause the craft to have movement relatively to the weights in tilting, the weights being maintained in positions substantially constant under the influence of the gyroscope. Thus, through the medium of the weights as controlled by the gyroscope, the center of gravity of the vessel is moved due to the displacement of portions of the mass as represented by the weights.

I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. In a stabilizer, a gyroscope, a frame in which the gyroscope is mounted to revolve, means to rockably mount said frame to turn through an angle about an axis transverse to the axis of rotation of the gyroscope, shiftable weights adapted to be mounted on a craft at opposite sides of the gyroscope, and means connecting said frame and weights to move said weights transversely to the position of the gyroscope by the rocking of said frame.

2. The combination with aerial or other craft, of shiftable weights thereon at opposite sides of the vertical center of the craft, a gyroscope mounted at the approximate center of the craft, a frame in which said gyroscope is mounted to revolve, said frame being rockable through an angle about an axis transverse to the axis of rotation of the gyroscope, connections between the said weights and frame, a fan adapted to be driven by the fluid pressure developed by the headway of the craft and co-axial with the said frame, and drive connections between the said fan and the gyroscope.

3. In a stabilizer, a frame having hollow trunnions, fixed bearings in which the said trunnions are journaled, a shaft coaxial with said trunnions and turning in one of said bearings, means to drive said shaft, a gyroscope in said frame and mounted to turn about a vertical axis, means within said frame establishing driving connection between said shaft and the gyroscope, a weight shiftable relatively to the position of the gyroscope, and connections between said frame and said weights.

RICHARD McMYERS.